July 30, 1968  D. J. MAST  3,394,824
BOTTOM UNLOADER FOR SILOS
Filed Dec. 1, 1965  3 Sheets-Sheet 1
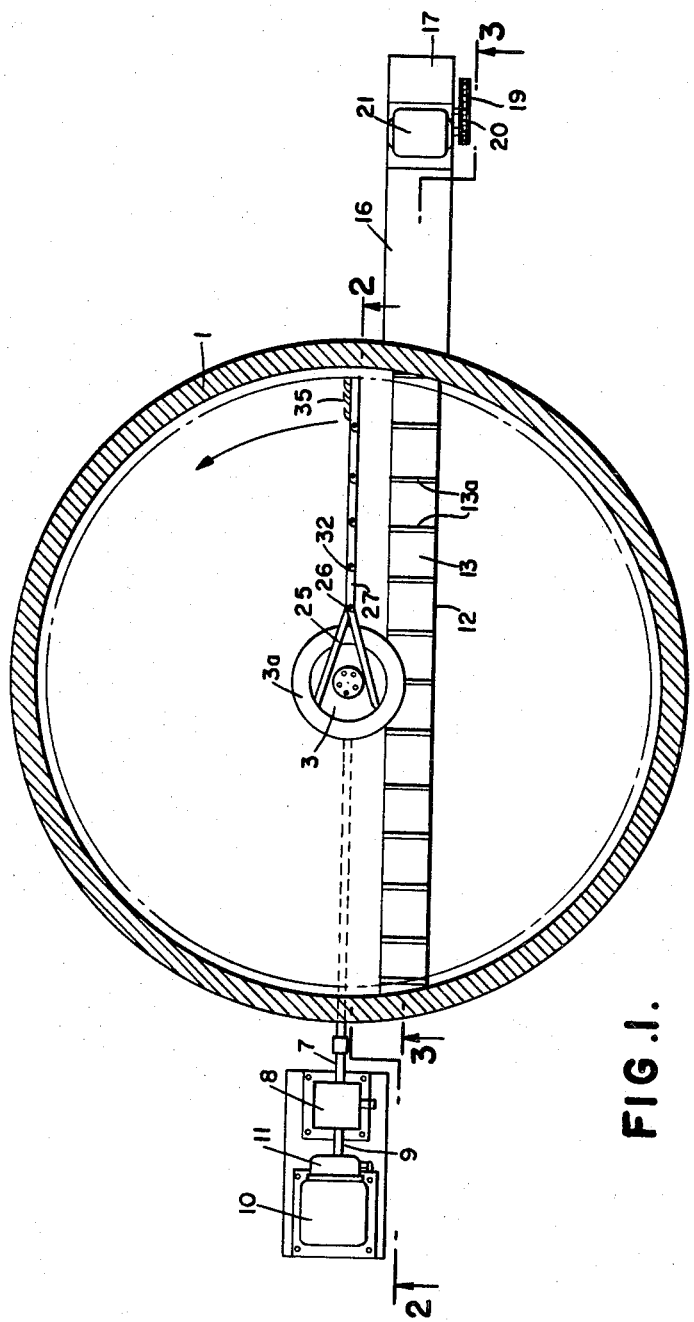
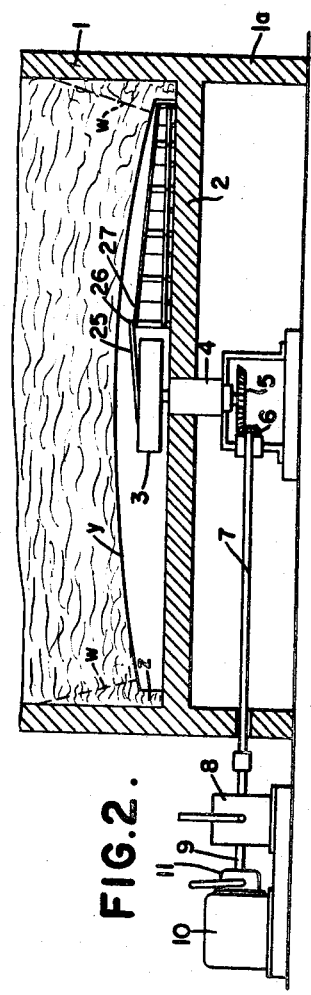
FIG.1.
FIG.2.
INVENTOR
Dean J. Mast
BY J. Hanson Boyden,
ATTORNEY July 30, 1968   D. J. MAST   3,394,824
BOTTOM UNLOADER FOR SILOS
Filed Dec. 1, 1965   3 Sheets-Sheet 2

INVENTOR
Dean J. Mast
BY J. Hanson Boyden
ATTORNEY

July 30, 1968     D. J. MAST     3,394,824

BOTTOM UNLOADER FOR SILOS

Filed Dec. 1, 1965     3 Sheets-Sheet 3

INVENTOR
Dean J. Mast

BY *J. Hanson Boyden*,

ATTORNEY

# United States Patent Office 3,394,824
Patented July 30, 1968

3,394,824
BOTTOM UNLOADER FOR SILOS
Dean J. Mast, Amelia, Va., assignor to Badger Northland Inc., Kaukauna, Wis.
Filed Dec. 1, 1965, Ser. No. 510,919
7 Claims. (Cl. 214—17)

ABSTRACT OF THE DISCLOSURE

An unloader for a silo including a rotatable flail like member driven from a center drive member in the floor of the silo so as to simultaneously cut and sweep silage into a slot formed in the floor. The flail member comprises a plurality of rigid sections pivoted together on a vertical axis to provide a flail that is rigid in a vertical plane but flexible in a horizontal plane.

This invention relates to means for unloading or removing silage from silos, and more particularly to bottom unloaders for silos.

The removal of silage from silos as it is needed for stock feeding purposes has always presented a difficult problem.

The general object of the present invention is to provide a power-operated bottom unloader which will reliably remove from a silo any desired quantity of silage and deliver the same from a discharge chute at a point well above the ground.

In order that the invention may be readily understood, reference is had to the accompanying drawings, forming part of this specification, and in which:

FIG. 1 is a planview of a silo equipped with my improved unloader, the walls of the silo being shown in section;

FIG. 2 is a fragmentary vertical section substantially on the line 2—2 of FIG. 1, looking in the direction of the arrows;

Figure 3:
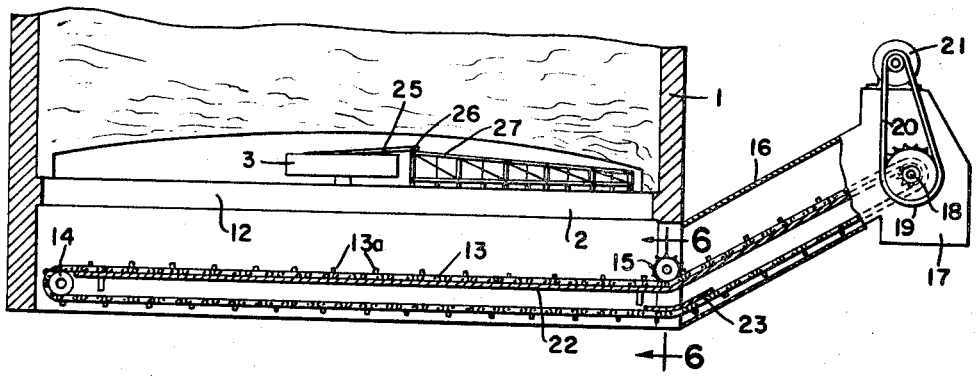
FIG. 3 is a fragmentary vertical section substantially on the line 3—3 of FIG. 1, looking in the direction of the arrows.

Referring to the drawings in detail, a conventional silo of the usual cylindrical form is shown at 1. The silo has a floor 2, and the walls are extended beyond the floor as indicated at 1a, so as to provide a hollow, empty space beneath the floor. The walls and floor are preferably formed of concrete. In this space is located a gear box containing a horizontal bevel gear 5, secured to the lower end of a vertical shaft journaled in bearings 4 extending up through the floor, and carrying at its upper end a center wheel 3.

Meshing with the bevel gear 5 is a bevel pinion 6, secured to the end of a horizontal shaft 7, extending out through the wall 1a to a variable speed transmission 8. This transmission is connected by a shaft 9, through a clutch 11, with a motor 10. Thus, the wheel 3 may be driven at any desired one of several different speeds.

Extending across the bottom of the silo is a trough 12, in which runs an endless conveyer 13. This consists of a pair of spaced, parallel chains with a series of cross bars 13a extending between them. This conveyor passes around a pair of sprockets 14, at one end. At the opposite side of the silo is an upwardly inclined duct 16, having at its end a vertically disposed discharge spout 17, and communicating with the end of the trough. The endless conveyer passes from the trough up through the inclined duct 16, and around a pair of sprockets 18 in said discharge spout, said sprockets being mounted on a shaft to which is also secured, outside of said spout, another sprocket 19, driven through a chain or belt 20 from a motor 21, mounted on said spout.

Figure 6:
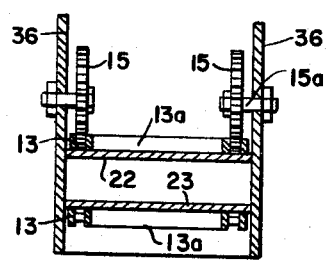
FIG. 6 is a fragmentary vertical section on an enlarged scale substantially on the line 6—6 of FIG. 3, looking in the direction of the arrows.

At the junction of said trough and duct is placed a pair of idler sprockets 15, bearing on the upper run of the conveyer to hold it in position, and under the lower run is placed a curved plate or slide 23, for the same purpose. The sprockets 15 are mounted on stub shafts, journaled in the side walls 36 of the trough. (See FIG. 6.) The upper run of the conveyer is preferably supported on a strip of metal, or the like 22, which extends the entire distance between the sprockets 14 and 15, and up through the duct 16.

Rigidly secured to the wheel 3 is an A-frame 25, and pivoted at 26 to the apex of this frame, which projects radially beyond the rim of the wheel, is one end of what, for lack of a better name, I call a "flail." This flail is relatively wide or deep, in an axial direction, and is composed of a plurality of sections, a, b, c, d and e, pivotally connected with each other as by pins 32 extending through alined openings in overlapping portions of the sections. Each section is shown as comprising upper and lower longitudinally extending members 27 and 28, cross-rods 29 and 30 near the ends, and a diagonal brace member 31.

Figure 4:
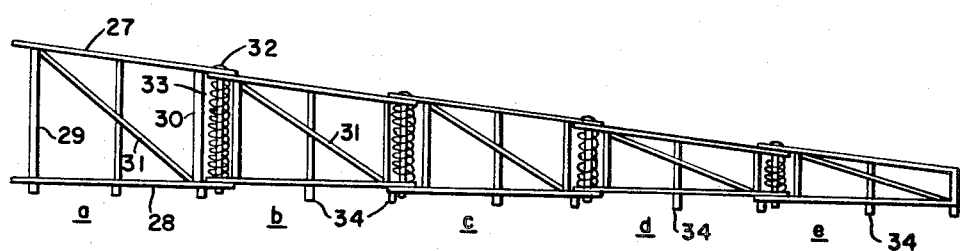
FIG. 4 is a side elevation of a novel flail, employed to sweep the silage off of the silo floor.
Figure 7:
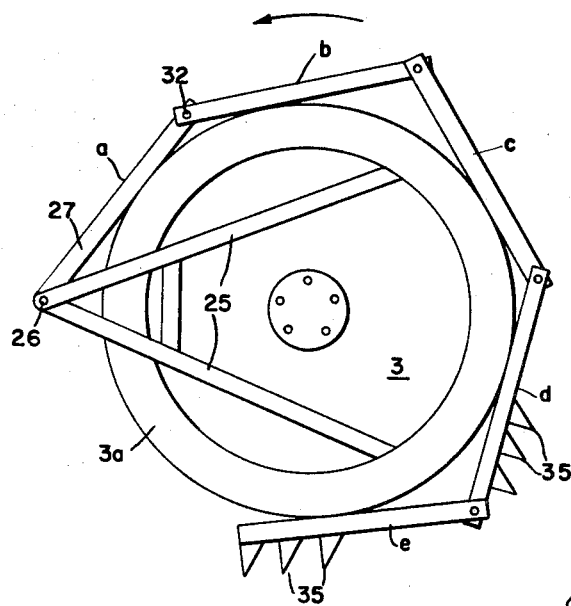
FIG. 7 is a plan view of the center wheel and flail, showing the flail as wrapped around the wheel.

Around each pivot pin 32 is coiled a helical spring 33. (FIG. 4.) The wheel 3 may or may not have a rubber tire 3a, similar to an automobile tire. The flail is constructed to wrap around the wheel as shown in FIG. 7, and springs 33 are so connected to the flail sections as to cause the sections to automatically wrap themselves around the wheel, when free to move, and assume the position shown in FIG. 7. The rubber tire, which is preferably used, serves to cushion the impact when the flail thus springs into position around the wheel.

The normal position of the flail, when the wheel is stationary, is as shown in FIG. 7. When the wheel begins to rotate in the direction shown by the arrow, the flail sections unwind from the wheel and are thrown outward by centrifugal force, against the tension of the springs, until it finally extends radially straight out from the wheel, as shown in FIGS. 1 and 2. As shown in FIGS. 2, 3 and 4, the upper edge of the flail is somewhat inclined, so that the flail tapers longitudinally in width toward the outer end. When moving outwardly towards and when it reaches this extended position, it sweeps over the silo floor, thus depositing the silage in the slot or trough of the conveyer.

As shown in FIG. 4, the flail is provided along its lower edge with a series of downwardly extending projections 34 constituting a rake, which assist in moving the silage over the floor.

Figure 5:
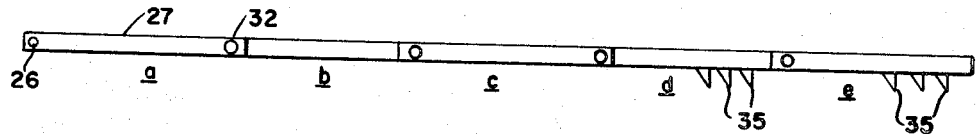
FIG. 5 is a plan view of this flail.

Also, as shown in FIGS. 5 and 7, the two end sections d and e of the flail are provided at one side with a series of laterally projecting teeth or short blades 35, which operate to cut up and loosen the silage as the flail rotates.

In filling a silo, it is common practice to use a distributor designed to scatter and direct the incoming silage in such a manner that it is deposited mostly around the sides. Thus the mass of material adjacent the walls is denser and more compact than that near the center, where it is relatively loose.

Figure 8:
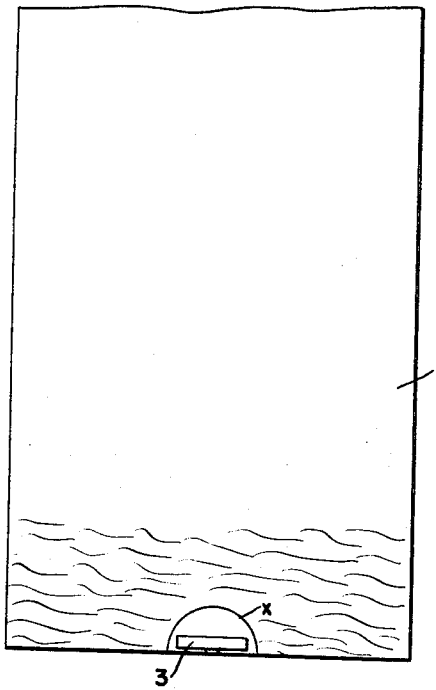
FIGS. 8 and 9 are diagrammatic views illustrating how my improved unloader operate.
Figure 9:
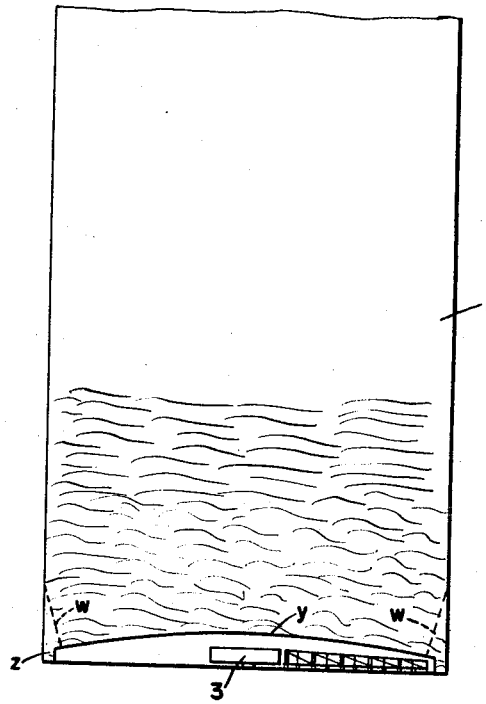

When the silo is being filled, the variable speed transmission is shifted into low gear, and the wheel rotated very slowly. At this speed, centrifugal force is not sufficient to cause the flail to unwind, and the result is that a small dome is opened up in the silage over the wheel, as shown at x, in FIG. 8. During this operation the conveyor is running, so that a certain amount of silage is discharged from the spout 17. Later, the wheel is speeded up, so that the flail cuts a larger and larger circle, eventually forming a large dome y, extending almost the full diameter of the silo, as shown in FIG. 9. This dome is self-supporting, like an arch, and after it is formed there is a substantial amount of space between it and the wheel.

But by reference to FIG. 9, it will be seen that the mass of silage above the dome is supported and prevented from settling further by a ring of silage z, next to the silo wall, which the flail has not cut. This ring is relatively dense and compact. After the silo has been filled, it looks somewhat as illustrated in FIG. 8, with a small dome x over the wheel. When it is desired to discharge a certain amount of silage for feeding, the wheel is started up at low speed, and then the speed increased. As the speed increases, the flail gradually tends to straighten out, cutting silage away from the superposed mass and depositing it into the conveyor. Meanwhile, as the mass settles, the dome x grows larger and larger, until, if the discharging operation is continued long enough, the dome will tend to approach the configuration shown at y in FIG. 9.

During or after the discharging operation, the overhanging central mass will "cave in" or slump off somewhat along the sloping dotted line w, shown in FIGS. 2 and 9, thus again enveloping the flail, and again forming a small dome x, in which the flail curls up around the wheel, when rotation of the wheel is stopped.

What I claim is:

1. A bottom unloader for circular silos having a floor, comprising an open trough extending transversely across at least part of the silo beneath the floor, means in said trough for carrying silage falling in said trough to the outside of the silo, and power-operated flexible flail means rotatable about and radially extending from the center of the silo above the floor for sweeping the silage from said floor into said trough, said flail means comprising a flexible flail member constructed to extend radially from and secured to a power operated drive member in the center of the silo, rotation of said member at a high speed causing centrifugal force on said flail member to extend the same radially of the shaft, said flail member acting to wrap around the drive member when the power to the drive member is cut off, said flail member further comprising a plurality of rigid sections pivotally connected on substantially vertical axes allowing said flail member to flex in a radial direction and wrap around said drive member, and so that said flail member is relatively rigid in a vertical direction with the flail remaining substantially in a plane parallel to and spaced from the silo floor.

2. A bottom unloader for circular silos having a floor, comprising an open trough extending transversely across at least part of the silo beneath the floor, means in said trough for carrying silage falling in said trough to the outside of the silo, and power-operated flexible flail means rotatable about and radially extending from the center of the silo above the floor for sweeping the silage from said floor into said trough, said flail means comprising a flexible multiple section flail member including a plurality of rigid sections pivotally connected on substantially vertical axes with one of said sections secured to a power operated drive member in the center of the silo, said pivotal connections permitting said flail to be initially wrapped around the drive member and to extend radially from the drive member when said drive member is rotated at a high speed, and to provide a flail that is relatively rigid in a vertical plane.

3. An unloader in accordance with claim 1 wherein the total length of the flail member when radially extended is slightly less than the radial distance from the cylindrical member to the silo wall.

4. An unloader in accordance with claim 1 wherein the circumference of said drive member is greater than the total length of said flail member so that the flail member cannot wrap upon itself.

5. An unloader in accordance with claim 1 in which means are provided to cause the flail to automatically wrap around the wheel as the latter slows down and the centrifugal force thereon is reduced.

6. An unloader in accordance with claim 5 in which the flail section nearest the silo center has a relatively large height and each section outward from said center decreases in height as to form a total flail member tapering radially outward to a relatively small height.

7. An unloader in accordance with claim 1 wherein at least the outer portion of the flail member carries one or more teeth for loosening silage as the flail rotates.

References Cited

UNITED STATES PATENTS

| 2,823,834 | 2/1958 | Buschmann. | |
| 3,011,658 | 12/1961 | Peterson | 222—228 X |
| 3,024,923 | 3/1962 | Osborne | 214—17 |
| 3,035,718 | 5/1962 | Behlen | 214—17 X |
| 3,138,300 | 6/1964 | Rintala | 214—17 X |
| 3,140,161 | 7/1964 | Poynor et al. | |
| 3,066,831 | 12/1962 | Thompson | 222—410 XR |

FOREIGN PATENTS

| 571,420 | 3/1959 | Canada. |
| 296,522 | 5/1965 | Netherlands. |
| 101,986 | 4/1963 | Norway. |

ROBERT G. SHERIDAN, *Primary Examiner.*